United States Patent [19]

Taylor

[11] 4,058,422
[45] Nov. 15, 1977

[54] APPARATUS FOR BONDING TREADS TO TIRES

[75] Inventor: Don A. Taylor, Wadsworth, Ohio

[73] Assignee: Victor E. Buehrle, Akron, Ohio

[21] Appl. No.: 724,951

[22] Filed: Sept. 20, 1976

[51] Int. Cl.² ........................................... B29H 17/36
[52] U.S. Cl. .................................... 156/96; 156/272; 156/394; 156/421; 219/243
[58] Field of Search ...................... 156/85, 86, 95, 96, 156/110 R, 123 R, 125–129, 272, 275, 285, 286, 289, 394, 407, 412, 421; 425/15–17, 20, 22, 26, 41; 29/235; 264/36, 326; 219/243, 244

[56] References Cited

U.S. PATENT DOCUMENTS

| 1,081,330 | 12/1913 | Price | 219/243 |
|---|---|---|---|
| 2,282,580 | 5/1942 | Hawkinson | 156/96 |
| 2,774,409 | 12/1956 | Skidmore | 156/96 |
| 2,955,640 | 10/1960 | Barns | 156/502 |
| 3,745,084 | 7/1973 | Schelkmann | 156/394 |
| 3,868,284 | 2/1975 | Hogan | 156/96 |
| 3,883,382 | 5/1975 | Pelletier | 156/96 |
| 3,920,498 | 11/1975 | Everhardt | 156/96 |
| 3,925,129 | 12/1975 | Blankenship | 156/96 |

FOREIGN PATENT DOCUMENTS

| 2,353,747 | 4/1975 | Germany | 156/96 |
|---|---|---|---|
| 555,680 | 9/1943 | United Kingdom | 156/96 |

*Primary Examiner*—Charles E. Van Horn
*Assistant Examiner*—John E. Kittle
*Attorney, Agent, or Firm*—Reese Taylor

[57] ABSTRACT

Improved apparatus is disclosed for bonding tread material to tire carcasses utilizing a flexible heat conducting belt one end of which is secured to the tread and the remaining length thereof encircles the periphery of the tread and, by virtue of its heat conducting properties, assists in the bond of the tread to the tire carcass. The flexibility of the belt, as contrasted to a rigid matrix, for example, also permits the belt to conform to the tread configuration. One form of the invention disclosed also includes a second belt laminated to the first and having more strength so that the required pressure to assist in the curing operation can be accomplished without using a conventional pressure chamber. A further form of the invention discloses a laminated metallic type belt which again has one end secured to the tread and is wrapped about the periphery of the assembled tire. This form of the invention includes a metallic outer layer and a resilient heat conducting inner layer so that again both the required heat and pressure can be utilized. A still further form of the invention discloses shiftable plates carried by tire engaging plates which can be brought to bear against the edges of the tread at the line of juncture with the side wall. Heating units are also provided in this area, and the shiftable plates insure that the edges of the tread will be securely sealed and seated against the side wall of the tire during the curing operation.

17 Claims, 12 Drawing Figures

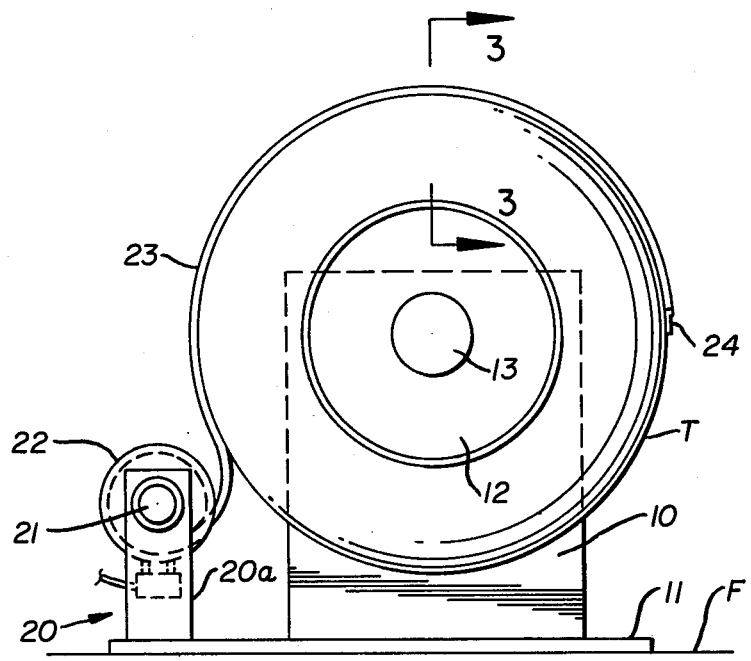
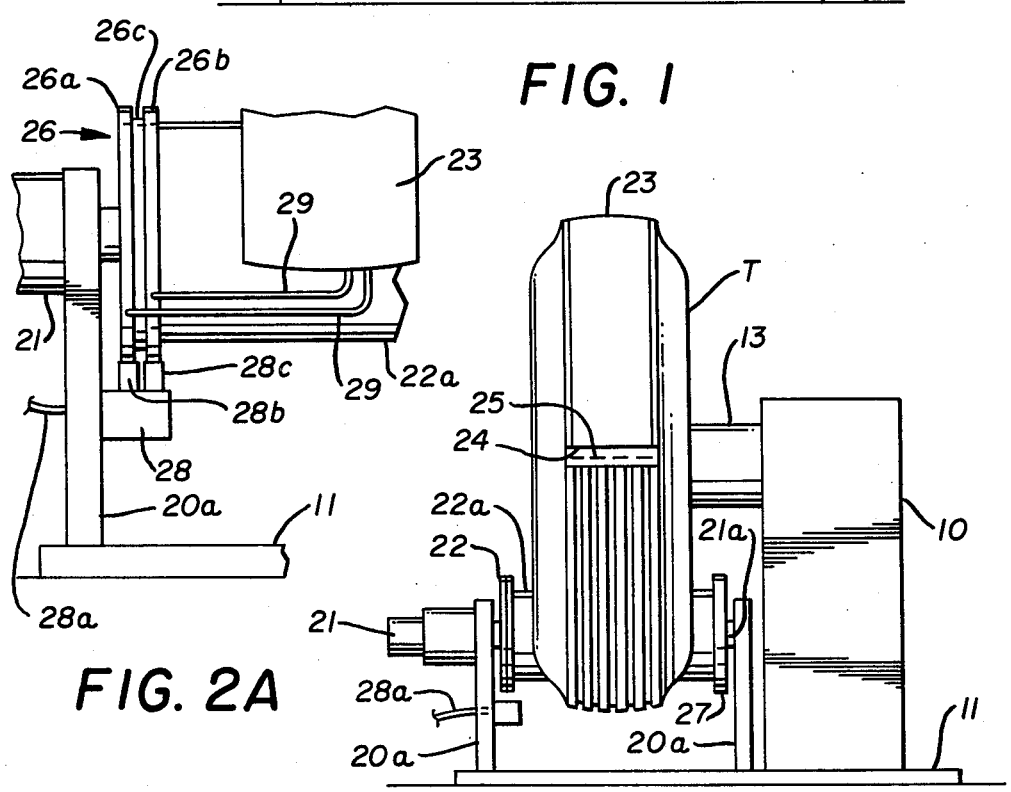
FIG. 1
FIG. 2A
FIG. 2

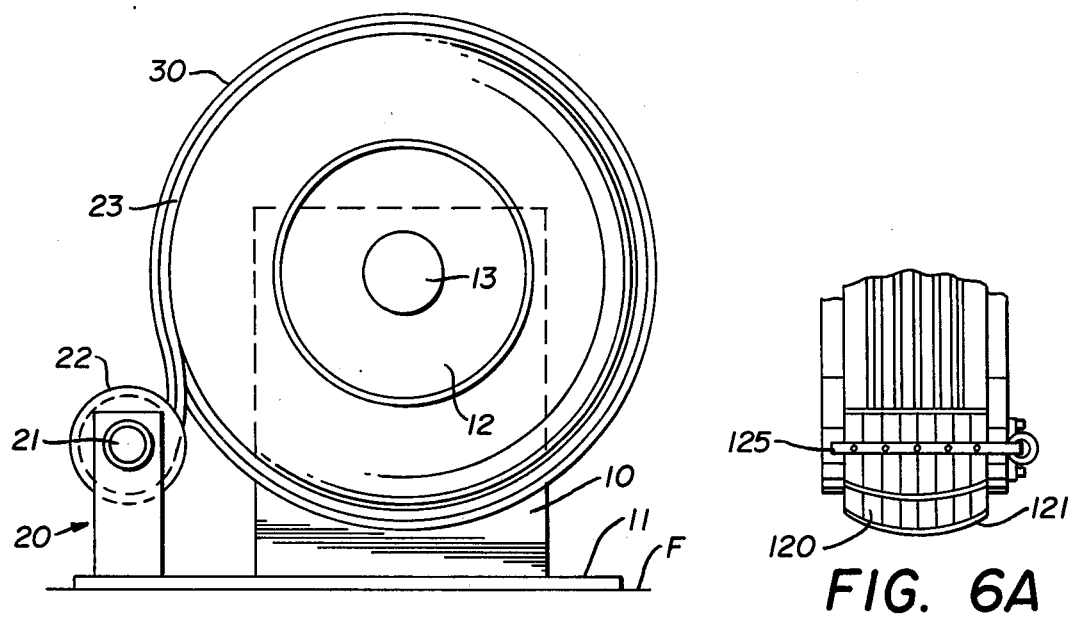
FIG. 5
FIG. 6A
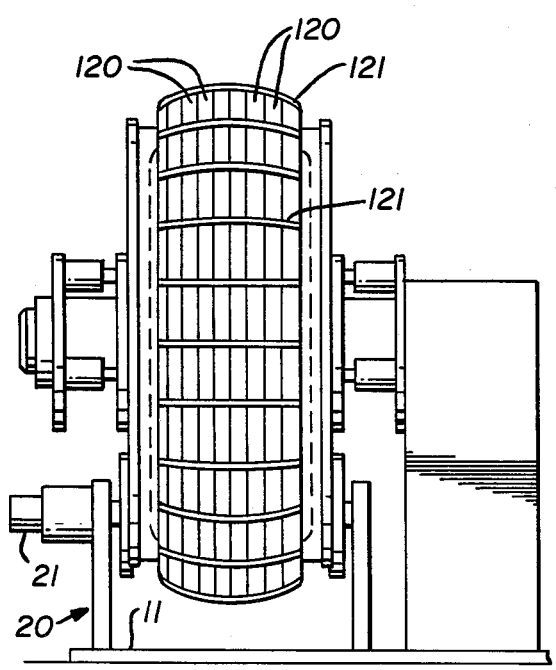
FIG. 7
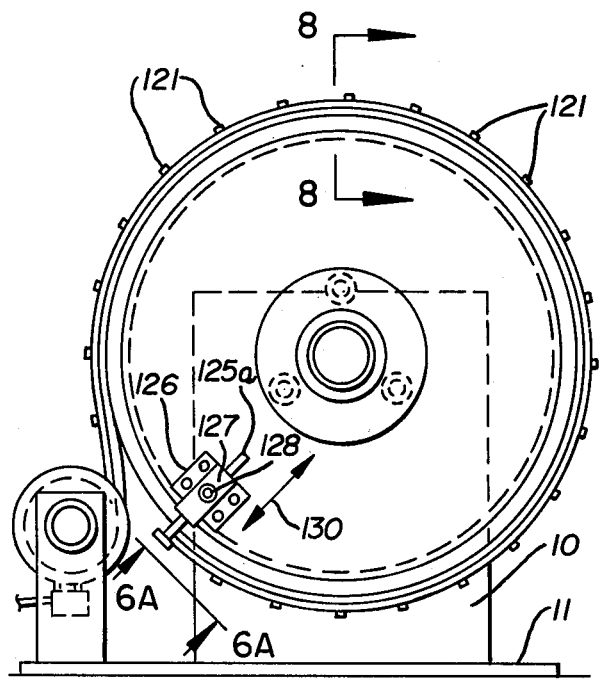
FIG. 6

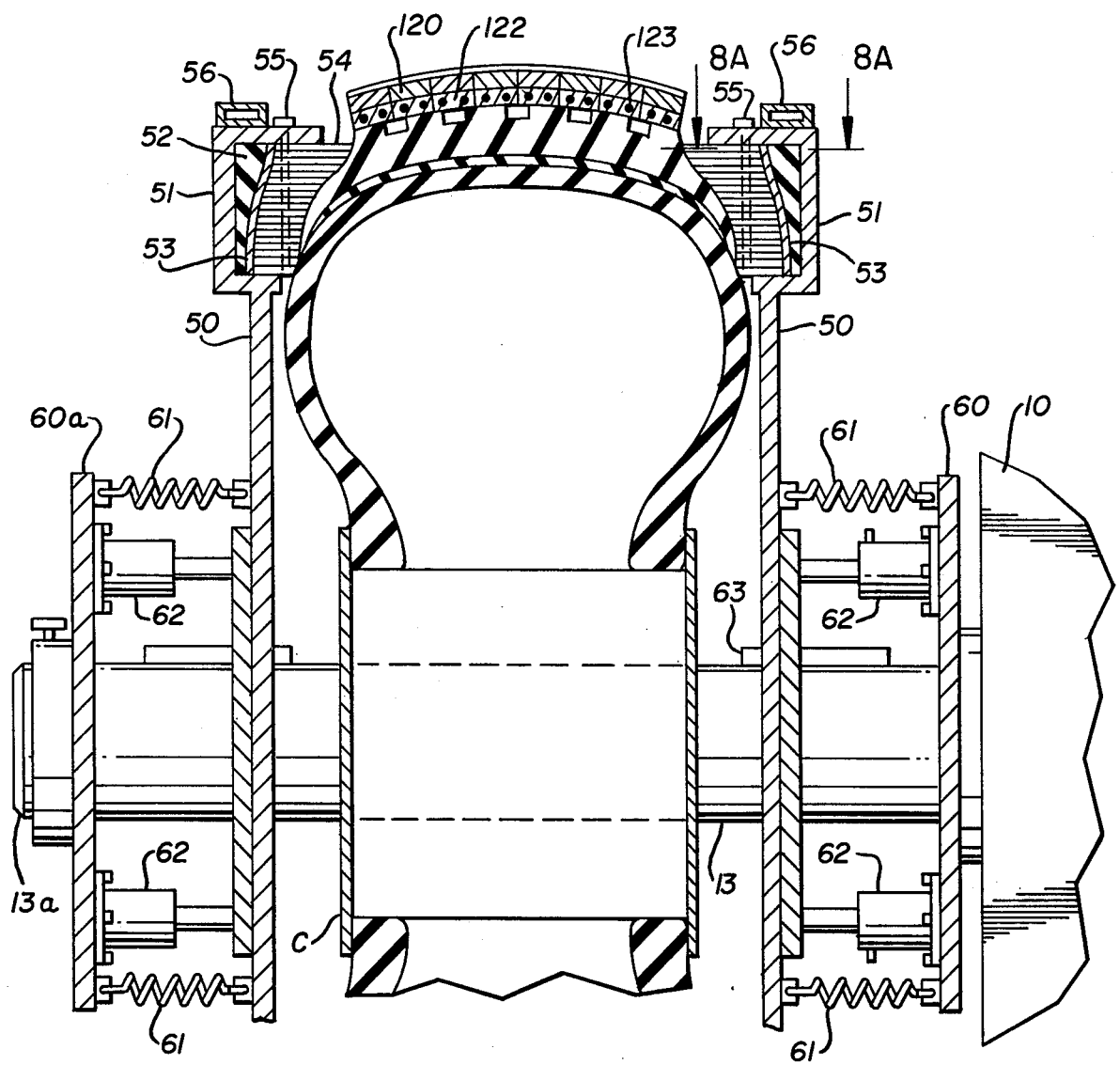
FIG. 8
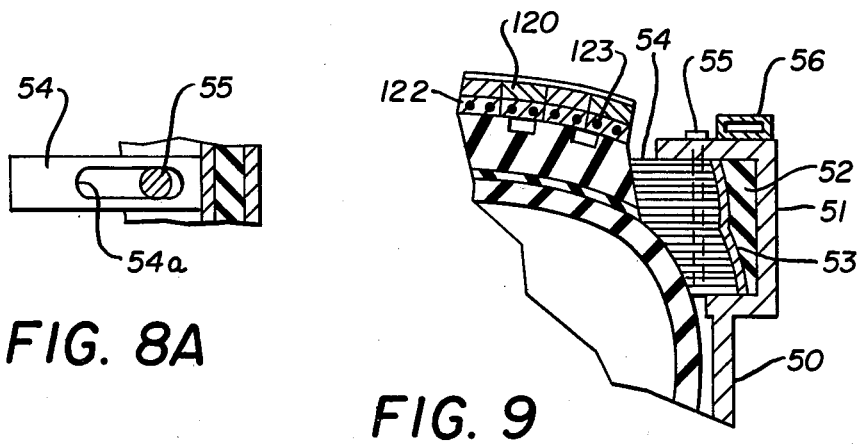
FIG. 8A
FIG. 9

APPARATUS FOR BONDING TREADS TO TIRES

FIELD OF THE INVENTION

This invention in general relates to the art of bonding treads to tire carcasses and, in particular, relates to utilization of a number of different belt type structures capable of encircling the periphery of the tire and preventing in all instances the necessary heat required to vulcanize and bond, and in most instances the necessary pressure for the bonding operation.

The invention has equal applicability to retreading or constructing new tires.

DESCRIPTION OF THE PRIOR ART

In the past, numerous difficulties have been encountered in either retreading an old tire or constructing a new tire with a preformed tread. These difficulties, at least in part, are caused by the fact that a rigid matrix normally used to hold the tread on the carcass, due to its very configuration, will not fully provide a total surface to surface contact with the tread due to the variations in contour due to design and, also to some degree, due to manufacturing inconsistency. Due to the fact that there are a large number of such variations, it is extremely costly to provide a rigid matrix for each and every variation.

The same problem also exists because of size variations, since a different size matrix or form would be required for each tire size.

The present invention is intended to overcome this difficulty by providing means which are almost infinitely adjustable and conformable so that they will be equally applicable to virtually every size tire and every tread contour.

SUMMARY OF THE INVENTION

The above-noted disadvantages can be overcome in a number of ways.

For example, it has been discovered that by providing a resilient stretchable flexible belt having heat conducting elements contained therein that the belt can be secured at its end to the tire and wrapped about the entire periphery of the tire. It has been found that by utilizing a belt of this type, that the required bonding heat can be applied directly at the tread area, and that due to the flexibility and resiliency of the belt that the belt will conform to virtually any tread contour or tire size.

It has also been discovered that a flexible fiberglass belt or one of similar material can be laminated over the heat belt so that not only are the above-noted advantages with regard to the bonding heat achieved, but the necessary pressure to hold the tread in place during the bonding operation is also achieved, thereby eliminating the need for the normal autoclaves or other pressure vessel.

It has been found in another modification of the invention that an articulated series of laminates of metal and heat conducting material can be used wherein again the necessary heat can be imparted to the tread for bonding purposes, and the necessary pressure can be applied by the overlying metallic members of the belt for holding purposes.

It has also been discovered that problems of blow or incomplete bonding in the edge areas of the side walls can be eliminated by providing a plurality of relatively movable plates which can be brought to bear against this area and securely clamp the edge portions of the thread to the side wall. The shiftable nature of the plates makes it possible for them to readily conform to any type side wall configuration so that again a more or less universal type apparatus is provided and is capable of conforming to virtually any size or shape of tire or tread.

Accordingly, production of an improved tread bonding apparatus of the character above described becomes the principal object of this invention, with other objects thereof becoming more apparent upon a reading of the following brief specification, considered and interpreted in view of the accompanying drawings.

OF THE DRAWINGS

FIG. 1 is a side elevational view showing one form of the improved bonding means.

FIG. 2 is an elevational view taken from the right of FIG. 1.

FIG. 2A is a fragmentary detail of the heat inducing mechanism.

FIG. 5 is a view similar to FIG. 4 showing the reenforcing belt in its final condition.

FIG. 6 is a side elevation of a still further embodiment.

FIG. 6A is an enlarged view taken along the line 6A—6A of FIG. 6.

FIG. 7 is an elevational view of the embodiment of FIG. 6, taken from the right thereof.

FIG. 8 is a sectional view taken along the line 8—8 of FIG. 6.

FIG. 8A is a sectional view taken along the line 8A—8A of FIG. 8.

FIG. 9 is a partial fragmentary sectional view showing a modification of the form of the invention shown in FIG 8.

BRIEF DESCRIPTION OF THE PREFERRED EMBODIMENTS

Figure 3:
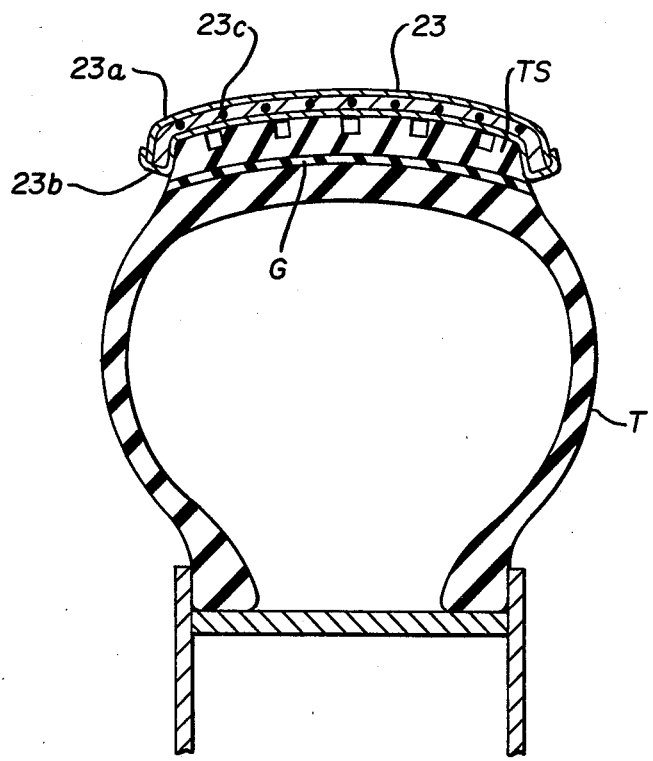
FIG. 3 is a partial sectional view taken along the line 3—3 of FIG. 1.

Referring first to FIG. 1, it will be noted that a tire rotating unit 10 is provided and is supported by a base 11 which, in turn, is supported on the factory floor F. A collapsible chuck or tire rim 12 is supported on the tire rotating unit 10 by means of the rotator shaft 13.

No great detail has been shown with regard to this structure since a tire rotator and an expandable and collapsible chuck mechanism would be articles well known to one having ordinary skill in this particular art.

Still referring to FIGS. 1 and 2, it will be noted that a belt drum support frame 20 is provided with supporting legs 20a, 20a which are also mounted on the base 11 and carry the motor 21 which is capable of driving the belt drum 22 about which is wrapped the belt 23. Belt drum 22 has a main body portion 22a which is carried by shaft 21a for rotation therewith. Drum 22 also has opposed flanges 26, 27 on its opposed ends, and one of these (26) is used to induce heat to the belt.

Thus, referring to FIG. 2A, it will be noted that flange 26 actually comprises a pair of plates 26a, 26b which are separated by insulating material 26c. An electrical componenet 28 connected to an electrical supply source by cable 28a is mounted on leg 20a and has brushes 28b and 28c which contact plates 26a and 26b so that electricity and thus heat can be introduced in the end of belt 23 by electrical leads 29.

Belt 23 is a resilient flexible heat conducting belt made of a material such as a stretchable woven silicone and is capable of being conformed to the exterior profile configuration of the tire T. Belt 23 is actually a three-piece laminate (See FIG. 3) with layers 23a, 23b of identical material surrounding a middle layer which carries resistance wire 23c so that the belt can be properly heated.

The outboard end of the belt 23 has a flap 24 which is stapled to the tire by means of staples 25, 25 or other suitable securing means so that the belt, in operation, may be stapled to the tread area of the tire T by the staples 25, following which actuation of the tire rotator 10 will draw the belt 23 off the drum 22 and about the circumference of the tire the desired distance until the entire periphery of the tire has been covered.

At this time, the tire could be encased in a conventional pressure vessel to provide the necessary heat and pressure to bond the tread material to the tire T.

The belt 23 is, as noted, a flexible heat producing member and is long enough to encircle the periphery of the tire and wide enough to at least cover the tread area thereof. Since the belt covers the tread stock TS, the heat supplied through wire 23c will be transmitted through the tread stock TS to cushion gum G to effectively bond the tread to the tire.

Figure 4:
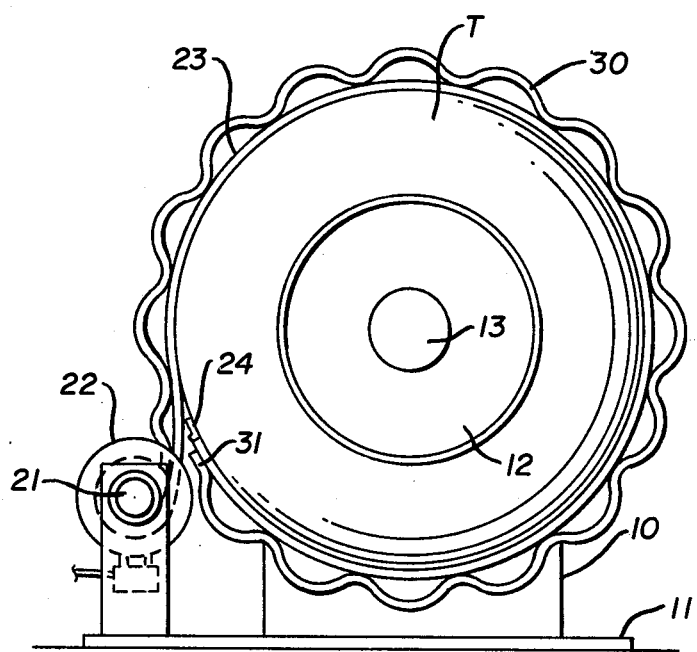
FIG. 4 is a side elevational view of a modified form of the invention.

FIGS. 4 and 5 show a modified form of the invention wherein the belt 23 is affixed to the periphery of the tire in a similar fashion to that shown in FIGS. 1 through 3. However, in this form of the invention, a heat resistant resilient pressure belt 30 made of fiberglass or some similar material is provided and is affixed to the tire in overlying relationship to the heat belt 23. This material 30 is looped or pleated so that in its relaxed or normal position it takes the form shown in exaggerated fashion in FIG. 4. Provision is thus made for stretching and conforming of the member 23 to conform to the tire contour. When belt 30 is stretched out as shown in FIG. 5, it provides a reinforcing or strengthening element to the flexible belt 23. In this regard, the end 31 of pressure belt 30 is secured to belt 23 adjacent flap 24, and rotation of shaft 13 will pull belt 30 into the condition shown in FIG. 5.

This embodiment makes it possible to provide both the heating and pressurizing means to bond the tread to the tire casing, eliminating the present pressurizing vessel, such as a bonding chamber or autoclave.

FIGS. 6 through 7 show further embodiments of the invention wherein a segmented belt is provided having a plurality of adjacently disposed elongate belt members 120, 120. These belt members are held together by heat belt strip retainer means 121, 121, disposed axially about the belt so that in this form of the invention, both the heating and strengthening elements are contained in one belt so that complete conformity can be provided to the contour of the tire.

These belt members are actually a laminate having an outer layer of thin gauge steel or similar material and an inner layer of flexible material 122 bonded to it and carrying resistance wire 123 similar to the form of the invention shown in FIGS. 1 through 5.

Furthermore, the articulated nature of this belt insures that the belt will fully cover the tread and will conform to the tread configuration.

FIGS. 6 through 8 also illustrate another means for accomplishing the function of staples 25, 25. Thus, bracket 125 can be used to secure the end of the belt to the tire (see FIG. 6A) to hold it in place.

In this regard, a plate 126 is secured to the chuck for movement therewith. A housing 127 projects from plate 126 and receives arm 125a which can slide within housing 127 in the direction of arrow 130 to accommodate various tire diameters, and which can be locked in place by lock nut 128. The projecting arm 125 is rivoted or otherwise secured to strips 120, 120, and this arrangement provides more clamping pressure than is possible with staples 25, 25.

FIG. 8 shows improved compensating clamping members to hold the tread to the tire during the bonding or vulcanizing period. FIGS. 8 and 9 show identical structures for this purpose, except that the two figures illustrate different coutours of tread side walls.

Accordingly, referring to FIG. 8 for example, opposed pressure plates 50, 50 are provided and secured to the tire rotator 10. This is accomplished by providing a first plate 60 and second plate 60a both of which are carried on the central shaft 13. Thus, first plate 60 is fixed adjacent rotator 10 for rotating movement with rotator arm 30 while second plate 60a is similarly fixed adjacent the outboard end 13a of the shaft.

These plates are connected to the pressure plates 50, 50 by the pressure plate retainer springs 61, 61. Piston cylinders 62, 62 are carried by first and second plates 60 and 60a and are capable of moving the pressure plates 50, 50 toward the tire chuck C against the pressure of the springs 61, 61. It should be noted that keys 63, 63 are mounted on the periphery of arm 30 so that the pressure plates 50, 50 can move in a linear path in response to cylinders 62, 62 and can also rotate with arm 30. Upon release of the pressure on the cylinders 62, 62 the springs 61, 61 will retract the plates 50, 50 away from the tire to permit removal thereof from collapsible chuck C.

With regard to the pressure plates 50, 50, it will be noted that the peripheries thereof are formed into C-shaped flange areas 51, 51. Mounted interiorly of each flange area are elastomeric pads 52, 52 and flexible metal plates 53, 53. Received against the opposed side of the plates 53, 53 are a plurality of leaves or plates 54, 54 which are slotted internally at 54a and held in place against rotation by pins 55, 55. The tops of each of these C-shaped flange members 51, 51 also carry heating elements 56, 56.

By this arrangement, when the cylinders 62, 62 are actuated, the plates 50, 50 move in toward the sidewalls of the tire and the leaves 54, 54 will slide relatively of each other to conform to the curvature or configuration of the tread material. This insures that the tread will be firmly held in place and additional heat can be applied thereto by the heating elements 56, 56. The sliding leaves 54, 54 are capable of accommodating an unlimited range of tire sizes and contours and also providing heat and pressure to achieve the tread bonding. The leaves also are spaced closely enough together so that the cushion gum will not flow out from between the tire T and the tread stock TS; but on the other hand, are spaced sufficiently so that trapped air and gas can be relieved between them to provide air pockets at the bonding zone which would cause blows or bubbles at that point.

While a full and complete description of the invention has been set forth in accordance with the dictates of the Patent Statutes, it should be understood that modifications can be resorted to without departing from the spirit hereof or the scope of the appended claims.

Thus, in several instances, Applicant has referred to specific materials for the various belts employed in this invention. It should be understood that the invention is not intended to be limited to any specific material and that other materials may be employed with equal success, so long as they have the necessary properties described in the foregoing specification.

What is claimed is:

1. Apparatus for bonding tread material to a tire carcass, comprising:
   A. a belt windup drum located adjacent to a rotatably mounted tire carcass;
   B. an elongate flexible belt carried by said drum with one end secured thereto;
   C. electrical resistance heat imparting means carried by said flexible belt;
   D. means for removably attaching the opposed end of said belt to the exterior surface of the tread material; and
   E. said flexible belt having a length sufficient to encircle the periphery of the tire carcass and said tread material.

2. The apparatus of claim 1 wherein said flexible belt includes:
   A. first and second flexible layers; and
   B. said heat imparting means being disposed between said first and second layers.

3. The apparatus of claim 1 wherein
   A. a second elongate, relatively stiff pressure belt is carried on said drum with one end secured thereto;
   B. the opposed end of said pressure belt being secured to the exterior surface of said first belt adjacent its point of attachment to the tread material; and
   C. said pressure belt having a length sufficient to encircle the periphery of the tire carcass and said tread material.

4. The apparatus of claim 3 wherein said pressure belt is longitudinally extendible from a minimum to a maximum length dimension.

5. The apparatus of claim 1 wherein said flexible belt includes:
   A. a plurality of elongate longitudinally non-extensible strips; and
   B. transverse flexible retainer members
      1. secured to the exterior surface of said non-extensible strips and
      2. spaced along the length thereof.

6. The apparatus of claim 5 wherein said means for removably attaching said belt to said treat material is adjustable radially of said tire.

7. Apparatus for bonding tread material to a tire carcass, comprising:
   A. a tire rotating machine for rotatably supporting the tire carcass;
   B. a belt support machine including a windup drum located adjacent to said tire carcass; C. an elongate flexible belt having first and second ends;
   D. said first end of said flexible belt being releasably attached to the exterior surface of the tread material;
   E. said second end of said flexible belt being attached to said drum of said belt support machine;
   F. electrical resistance heat imparting means carried by said flexible belt;
   G. electric current supplying means
      1. carried by said belt support machine and
      2. connected to said heat imparting means at said second end of said flexible belt; and
   H. said flexible belt having a length sufficient to encircle the periphery of the tire carcass and said tread material.

8. The apparatus of claim 7 wherein said flexible belt includes:
   A. first and second flexible layers;
   B. said heat imparting means being disposed between said first and second layers.

9. The apparatus of claim 7 wherein
   A. a second elongate, relatively stiff pressure belt having first and second ends is carried by said drum;
   B. said first end of said pressure belt being attached to the exterior surface of said flexible belt adjacent the first end thereof;
   C. said second end of said pressure belt being attached to said drum of said belt support machine; and
   D. said pressure belt having a length sufficient to encircle the periphery of the tire carcass and said tread material.

10. The apparatus of claim 9 wherein said pressure belt is longitudinally extendible from a minimum to a maximum length dimension.

11. The apparatus of claim 7 wherein said flexible belt includes:
    A. a plurality of elongate longitudinally non-extensible strips; and
    B. transverse flexible retainer members
       1. secured to the exterior surface of said non-extensible strips and
       2. spaced along the length thereof.

12. The apparatus of claim 11 wherein said means for removably attaching said belt to said tread material is adjustable radially of said tire.

13. Apparatus for bonding tread material to a tire carcass, comprising:
    A. means for pressing the tread material to the periphery of said carcass and applying heat thereto;
    B. a tire rotating machine for rotatably supporting the tire carcass;
    C. opposed pressure plates
       1. carried by said tire rotating machine on opposite sides of the tire carcass;
       2. being movable toward and away from the sidewalls of the tire carcass and into and out of contact with a portion of the sidewall and tread;
    D. each of said pressure plates having annular pockets at their peripheries opening inwardly toward the tire carcass;
    E. axially rigid resiliently mounted adjustable pressure means carried in said pockets of said pressure plates for contact with the tread material and tire carcass which are capable of conforming to the surface contour of the tire at the area of contact; and
    F. heating elements carried by said pressure plates adjacent said pockets.

14. The apparatus of claim 13 wherein each said pressure means includes:
    A. a resilient cushion member seated in the pocket;
    B. a flexible plate overlying said cushion member;
    C. a plurality of thin circular leaves stacked on each other each having one axial edge bearing against said flexible plate; and D. retention means carried by said pressure plates and shiftably holding said leaves in said pockets.

15. The apparatus of claim 14 wherein
A. said leaves each having elongate radially extending slots therein; and
B. said retention means including at least one bolt secured to said pocket and passing through said slots.

16. A method for bonding tread material to a tire carcass, comprising the steps of:
A. applying the tread precured material to the periphery of the carcass with an intermediate uncured bonding layer;
B. releasably attaching one end of an electrical resistance heated flexible belt, wound on a belt windup drum located adjacent the rotatably mounted tire, to the tread material;
C. rotating the tire carcass, unwinding said belt until said belt encircles the periphery of the tire, and with the second end of the belt remaining secured to the belt windup drum;
D. inducing heat into the belt until the tread is bonded to the carcass; and
E. removing the belt from the tire.

17. The method of claim 16 wherein
A. a second elongate, relatively stiff pressure belt carried on said drum with one end secured thereto;
B. the opposed end of said pressure belt being secured to the exterior surface of said first belt adjacent its point of attachment to the tread material; and
C. said pressure belt having a length sufficient to encircle the periphery of the tire carcass and said treat material wherein the pressure belt is placed around the tire carcass and tensioned prior to starting heating.

* * * * *